United States Patent [19]

Cantu et al.

[11] Patent Number: 4,957,165

[45] Date of Patent: * Sep. 18, 1990

[54] WELL TREATMENT PROCESS

[75] Inventors: Lisa A. Cantu, Ponca City, Okla.; Marion W. Osborne, Houston, Tex.; Edward F. McBride, Wilmington, Del.

[73] Assignee: Conoco Inc., Ponca City, Okla.

[*] Notice: The portion of the term of this patent subsequent to Jul. 18, 2006 has been disclaimed.

[21] Appl. No.: 368,689

[22] Filed: Jun. 19, 1989

Related U.S. Application Data

[63] Continuation-in-part of Ser. No. 155,786, Feb. 16, 1988, Pat. No. 4,848,467.

[51] Int. Cl.$^5$ .............. E21B 33/138; E21B 43/12
[52] U.S. Cl. .................... 166/295; 166/297; 166/300; 166/305.1; 252/8.551
[58] Field of Search ............ 166/278, 281, 282, 283, 166/291, 297, 300, 305.1, 307, 308, 312, 295; 252/8.551, 8.553

[56] References Cited

U.S. PATENT DOCUMENTS

| | | | |
|---|---|---|---|
| 4,083,407 | 4/1978 | Griffin, Jr. et al. | 166/291 |
| 4,304,300 | 12/1981 | Watson | 166/291 |
| 4,343,363 | 8/1982 | Norton et al. | 166/281 |
| 4,470,915 | 9/1984 | Conway | 166/308 |
| 4,541,485 | 9/1985 | Block | 166/281 |
| 4,715,967 | 12/1987 | Bellis et al. | 166/283 |
| 4,848,467 | 7/1989 | Cantu et al. | 166/300 X |

*Primary Examiner*—George A. Suchfield
*Attorney, Agent, or Firm*—Richard W. Collins

[57] ABSTRACT

Hydroxyacetic acid condensation product is used as a fluid loss material in a well completion or workover process in which a fluid comprising a hydrolyzable aqueous gel is used. The hydroxyacetic acid condensation product degrades at formation conditions to provide hydroxyacetic acid which breaks the aqueous gel, thereby restoring full formation permeability without the need for separate addition of gel breaker.

7 Claims, No Drawings

WELL TREATMENT PROCESS

RELATED APPLICATION

This application is a continuation-in-part of our copending application Ser. No. 07/155,786 filed Feb. 16, 1988 for "Formation Fracturing Process".

BACKGROUND OF THE INVENTION

This invention relates to a process for completing or working over a well penetrating a subterranean formation such as an oil and/or gas producing formation.

By definition a completion or workover fluid is a fluid that is placed against the producing formation while conducting such operations as well killing, cleaning out, drilling in, plugging back, controlling sand, or perforating. Basic fluid functions are to facilitate movement of treating fluids to a particular point downhole, to remove solids from the well, and to control formation pressures.

Required fluid properties vary depending on the operation, but the possibility of formation damage is always an important concern. In certain operations, such as gravel packing or perforating, sand-face or perforation plugging is a prime concern. In recent years many new fluid systems have appeared, most due to the recognition of the high risk of reducing the productivity, or completely plugging certain sections of the producing zone, through contact with a foreign fluid.

Fluid density should be no higher than needed to control formation pressure. With reasonable precautions a hydrostatic pressure of 100–200 psi over formation pressure is adequate. Balanced or slightly underbalanced pressure workovers are ideal from the standpoint of formation damage and, with proper equipment to contain the surface pressure, are practical for some operations.

Fluid loss characteristics of the treatment fluid are tailored to prevent loss of excessive quantities of fluid to the formation, or to permit application of "hydraulic stress" to an unconsolidated sand formation. Bridging at the formation face by properly sized acid-soluble particles (calcium carbonate) is a conventional approach to fluid loss control. In some cases, oil soluble resin particles have been used in place of calcium carbonate. In either case colloidal particles are also required for an effective seal.

Viscosity-related characteristics, such as yield point, plastic viscosity, and gel strength, can be tailored to provide fluid lifting capacity required to bring sand to the surface at reasonable circulating rates. In some cases viscosity builders cause permanent reduction in permeability. This can be minimized by careful polymer selection along with adequate fluid loss control to limit invasion.

In a typical treatment fluid, a fluid viscosity builder is provided to control fluid loss. Viscosity builders such as hydroxyethyl cellulose or other hydrolyzable polymer are commonly used, and typically result in formation of a gel filter pad covering all or part of the treated formation. When a solid fluid loss additive such as particles of calcium carbonate is included in the fluid, it is generally necessary to carry out an acid treatment to dissolve the particles and to restore formation permeability.

Unbroken hydroxyethyl cellulose gel, even in the absence of calcium carbonate particles, can cause significant permeability reduction even after backflow. The possibility of permanent permeability loss from invasion of viscosity builders into the formation dictates that proper bridging particles should be used. Unfortunately the most commonly used material, calcium carbonate, must be removed after the treatment by acidizing. Even with acidizing, some permanent damage is possible. The acid treatment also results in breaking of the gel in the gel filter pad, but in some cases additional gel-breaking treatment is required.

SUMMARY OF THE INVENTION

According to the present invention, condensation products of the type described in U.S. Pat. No. 4,715,967 to Bellis et al. are utilized in a completion or workover fluid to provide fluid loss properties and to also provide gel breaking capabilities such that the gel filter pad comprised of condensation product and concentrated gel on the wellbore surface is essentially completely removed, thereby restoring full permeability for the well.

DESCRIPTION OF THE PREFERRED EMBODIMENT

The process of this invention basically is a well treatment procedure utilizing as the treatment fluid an aqueous gel with a specific particulate fluid loss additive in a specific amount.

The fluid loss additives in the present invention comprise inexpensive, low molecular weight condensation products of hydroxyacetic acid with itself or with compounds containing other hydroxy, carboxylic acid, or hydroxycarboxylic acid moieties. The condensation products are friable solids with a melting point of about 160° C. or higher and are substantially crystalline at both ambient and wellbore temperatures. They have a number average molecular weight of 200 to 4000 and preferably are oligomers having a number average molecular weight of about 200 to about 650. They are primarily trimers up through decamers. They are insoluble in both aqueous and hydrocarbon media but will degrade at specific rates in the presence of moisture and temperatures above about 50° C. to form oil, and/or water-soluble monomers and dimers. Rate of hydrolysis at a given temperature can be increased by incorporating small amounts of other molecules (usually less than 15% by weight) into the hydroxyacetic acid condensation reaction. These other molecules are usually flexible or more bulky than hydroxyacetic acid and partially disrupt crystallinity but leave the condensation product friable. Thus, the treatment agent can be tailored to adjust the rate of hydrolysis from a few hours to several days by controlling the amount and nature of the crystallinity.

As used herein, the term "hydroxyacetic acid condensation product" refers to a material within the description in the preceding paragraph.

The aqueous gels applicable to the present invention include those formed from the hydrolyzable gelling agents described in U.S. Pat. No. 4,470,915 to Conway. The most commonly used gelling agent, and the preferred one for purposes of this invention, is hydroxyethyl cellulose.

The treatment fluid used in the invention comprises an aqueous gel, preferably substantially completely hydrolyzed, and a particulate solid material comprised at least in part of hydroxyacetic acid condensation product. The amount of condensation product in the completion fluid is at least that amount which, upon degradation, results in substantial removal of the gel filter pad formed during the treatment step. For normal treatments, at least 10 pounds of condensation product per 1,000 gallons of treatment fluid is necessary. Condensation product concentration in treatment fluid refers to the portion of the treatment fluid to which it is added. It is not unusual to use during the procedure one or more slugs of treatment fluid which do not contain the fluid loss additive.

The particle size distribution for the condensation product depends to some extent on the formation to be treated. The desired average particle size in microns can be estimated as the square root of the formation permeability in millidarcys. Particles from submicron to about 200 microns are typically used, and the desired average particle size for most formations will range from about 10 to about 50, recognizing that particles smaller and larger than the average are present.

The process of this invention can effectively control fluid loss in completion or workover operations, and the acidic degradation products (hydroxyacetic acid monomer and dimer) of the fluid loss additive which are produced as a result of the formation conditions break the gel in the gel filter pad and essentially completely remove the gel filter pad with no permanent formation damage.

The hydroxyacetic acid condensation products can be utilized as the sole fluid loss additive or in combination with other fluid loss additives. It is only essential that the condensation products be degradable at formation conditions, and that they be used in an amount sufficient to substantially completely break the gel in the gel filter pad which is formed during the treatment. The condensation products, as shown in the aforementioned Bellis et al. patent, can be tailored to suit the conditions in the formation to be treated. The process eliminates the need for a separate gel breaker injection step. Often, a separately injected gel breaker only contacts a small fraction of the gel pad, resulting in less than full potential well productivity or injectivity after the treatment.

The exact amount and type of additive for a particular completion treatment in accordance with the invention will depend on factors such as formation type and temperature, etc. It is essential in carrying out the invention that a condensed hydroxyacetic acid product in the form of finely divided particles be incorporated in a treatment fluid in an amount sufficient to provide sufficient degradation products in a reasonable time at formation conditions to restore formation permeability by breaking the gel in the gel filter pad formed during the treatment step. A typical well completion process utilizing the invention is described in the following example.

EXAMPLE I

In this example, a well is drilled to a depth of 10,000 feet. The drilling mud is displaced with seawater and a pressure 100 psi over balance is maintained. A completion fluid comprising filtered seawater with 80 pounds/1000 gallons hydrated hydroxyethyl cellulose and 20 pounds/1000 gallons particulate hydroxyacetic acid condensation product (average particle size 20 microns) is pH adjusted to about 6 to facilitate gelling of the hydroxyethyl cellulose. The pH adjusted completion fluid with hydrated gel and particulate condensation product is pumped down hole to displace the seawater, and when the completion fluid is in place the well is perforated in a conventional manner. Displacement of completion fluid into the perforations and/or the formation surface results in formation of a filtercake layer of gel and particulate hydroxyacetic acid condensation product. After the well is stabilized in leakoff, the perforating equipment is removed and the well is ready for the next phase of the completion process. Hydrolysis of the condensation product at formation conditions provides hydroxyacetic acid which breaks the gel in the filtercake without the need for separate addition of a gel breaker or an acidizing step. The filtercake is thus removed, and the formation is undamaged, so that completion of the well can proceed.

Numerous modifications to and variations of the above described preferred embodiments will be apparent to those skilled in the art. Such modifications and variations are intended to be included within the scope of the invention as defined by the appended claims.

We claim:

1. In a process for treating a well in a subterranean formation penetrated by a wellbore wherein a well treatment fluid comprising an aqueous gel is pumped down said wellbore as part of a well treatment procedure, wherein a particulate fluid loss additive is included in said well treatment fluid, and wherein a gel filter cake is formed on the surfaces of said wellbore in said formation, the improvement comprising:

utilizing as at least a part of said fluid loss additive a hydroxyacetic acid condensation product, said condensation product being degradable at formation conditions whereby hydroxyacetic acid monomers and dimers are formed, and said condensation product being present in an amount sufficient to provide enough degradation products including hydroxyacetic acid to react with and break the gel in said filter cake and to recover permeability in said formation without the necessity of adding a separate gel-breaking material after formation of said gel filter cake.

2. The process of claim 1 wherein said gel is hydroxyethyl cellulose.

3. The process of claim 1 wherein said hydroxy-acetic acid condensation product is a condensation product of hydroxyacetic acid with up to 15 weight percent co-condensing compounds containing other hydroxy-, carboxylic-acid-, or hydroxycarboxylic acid moieties, said condensation product having a number average molecular weight of about 200 to 4000, being substantially crystalline at both ambient and wellbore temperatures and having a melting point of about 160° C. or higher and sufficiently high to avoid softening or melting during use and being substantially insoluble in said treatment fluid and degradable in the presence of water at elevated temperature to monomers and dimers which are at least partially soluble in oil or water.

4. The process of claim 3 wherein said aqueous gel is fully hydrated prior to being combined with said condensation product.

5. The process of claim 4 wherein said fluid loss additive consists essentially of said condensation product.

6. The process of claim 4 wherein said condensation product is added in an amount of at least 10 pounds per 1000 gallons of treatment fluid.

7. The process of claim 6 wherein the average particle size of said condensation product is from 10 to 50 microns.

* * * * *